(12) United States Patent
Hymel et al.

(10) Patent No.: US 8,531,536 B2
(45) Date of Patent: Sep. 10, 2013

(54) APPARATUS, AND ASSOCIATED METHOD, FOR SELECTING INFORMATION DELIVERY MANNER USING FACIAL RECOGNITION

(75) Inventors: James Allen Hymel, Kitchener (CA); Thomas Edward Byrd, Wokingham (GB); Julien Camille Paul-Cavallier, London (GB); Finbarr Michael O'Carroll, Sunrise, FL (US)

(73) Assignee: BlackBerry Limited, Waterloo (CA)

( * ) Notice: Subject to any disclaimer, the term of this patent is extended or adjusted under 35 U.S.C. 154(b) by 175 days.

(21) Appl. No.: 13/030,001

(22) Filed: Feb. 17, 2011

(65) Prior Publication Data

US 2012/0212629 A1    Aug. 23, 2012

(51) Int. Cl.
*H04N 5/232* (2006.01)
*H04L 29/08* (2006.01)

(52) U.S. Cl.
USPC .................................... 348/211.2; 455/414.4

(58) Field of Classification Search
USPC ................ 455/414.4, 414.1, 466; 348/62, 348/77, 211.2, 333.03
See application file for complete search history.

(56) References Cited

U.S. PATENT DOCUMENTS

| | | | | |
|---|---|---|---|---|
| 7,286,979 | B2 * | 10/2007 | Maeda et al. | 704/201 |
| 7,489,767 | B2 * | 2/2009 | Hikishima | 379/88.14 |
| 7,986,941 | B2 * | 7/2011 | Luo | 455/412.1 |
| 8,103,509 | B2 * | 1/2012 | Burns et al. | 704/270.1 |
| 8,145,199 | B2 * | 3/2012 | Tadayon et al. | 455/418 |
| 2002/0125993 | A1 * | 9/2002 | Gutta et al. | 340/5.52 |
| 2002/0191757 | A1 * | 12/2002 | Belrose | 379/88.13 |
| 2002/0193996 | A1 * | 12/2002 | Squibbs et al. | 704/260 |
| 2004/0214596 | A1 | 10/2004 | Lee | |
| 2007/0072592 | A1 * | 3/2007 | Kim | 455/414.4 |
| 2007/0117553 | A1 * | 5/2007 | Arnos | 455/414.4 |
| 2008/0057925 | A1 * | 3/2008 | Ansari | 455/414.4 |
| 2008/0126491 | A1 * | 5/2008 | Portele et al. | 709/206 |
| 2011/0300833 | A1 * | 12/2011 | Shaw | 455/413 |
| 2012/0149341 | A1 * | 6/2012 | Tadayon et al. | 455/412.1 |
| 2012/0157127 | A1 * | 6/2012 | Ferren et al. | 455/456.6 |
| 2012/0172012 | A1 * | 7/2012 | Sumcad et al. | 455/414.1 |
| 2012/0214472 | A1 * | 8/2012 | Tadayon et al. | 455/418 |
| 2012/0220283 | A1 * | 8/2012 | Tadayon et al. | 455/418 |
| 2012/0231821 | A1 * | 9/2012 | Swanson | 455/466 |
| 2012/0270575 | A1 * | 10/2012 | Ferren et al. | 455/458 |
| 2013/0107027 | A1 * | 5/2013 | Muellhaeuser | 348/77 |

FOREIGN PATENT DOCUMENTS

WO        2010147821 A2       12/2010

OTHER PUBLICATIONS

Extended European Search report mailed Apr. 22, 2013, in corresponding European patent application No. 11169085.5.

(Continued)

*Primary Examiner* — John Villecco
(74) *Attorney, Agent, or Firm* — Novak Druce Connolly Bove + Quigg LLP

(57) ABSTRACT

An apparatus, and an associated method, selects a manner by which to deliver received information at a wireless, or other electronic, device. A facial recognition indication is obtained and analyzed. Responsive to the analysis of the facial recognition indication, selection is made of the manner by which to deliver the information. If the facial recognition indication indicates the recipient to exhibit a serious demeanor, the information is provided in aural form, thereby to permit delivery of the information without requiring the recipient to read, or otherwise view, the information.

19 Claims, 4 Drawing Sheets

(56) References Cited

OTHER PUBLICATIONS

Busso, C et al., "Analysis of Emotion Recognition Using Facial Expressions, Speech and", http://graphics.usc.edu/cgit/pdf/papers/ICMI2004-emotionrecog_upload.pdf, pp. 1-7, retrieved May 19, 2005.

Mack, B., "Toshiba Brings Facial Recognition to Cars, Wired.com", http://www.wired.com/autopia/2009/06/facial-recognition/, pp. 1-4, Jun. 1, 2009.

Scott, M., "This Computer May Be Too Smart,", http://www.businessweek.com/globalbiz/content/jul2006/gb20060713_595118.htm?chan=tcl; BusinessWeek Online, Jul. 13, 2006 pp. 1-3, retrieved Jul. 18, 2006.

\* cited by examiner

APPARATUS, AND ASSOCIATED METHOD, FOR SELECTING INFORMATION DELIVERY MANNER USING FACIAL RECOGNITION

The present disclosure relates generally to a manner by which to deliver information to a user of a wireless, or other electronic, device. More particularly, the present disclosure relates to an apparatus, and an associated method, by which to select delivery of the information based upon a facial recognition indication. The information is delivered in an aural manner if the facial recognition indication of the user indicates the information best to be delivered in aural, rather than textual, or other, form.

Use of facial recognition permits selection of the manner by which to deliver the information that is most appropriate at the time at which the information is to be delivered. When information is received at the device, or is otherwise made available for delivery to the user, a facial recognition indication of the user is obtained. And, based upon the indication, the selection of the delivery manner is made.

BACKGROUND

Cellular, and other wireless, communication systems are used by many. Network infrastructures of wireless communication systems have been installed to encompass significant portions of the populated areas of the world. A wireless device, when positioned in the coverage area defined by the network infrastructure that encompasses a geographical area, and permitted access to the network, is able to communicate with a communication endpoint by way of the network infrastructure. And as communications are performed between the wireless device and the network infrastructure by way of radio channels defined upon a radio air interface formed between the infrastructure and the device, no physical connection is required to be made to the wireless device to provide for the communications by and with the wireless device.

A wireless device used in a cellular, or cellular-like, communication system is often times of small dimensions thereby to permit the wireless device to be hand-carried by, or otherwise carried on the person of, the user. Due to this portability provided to a wireless device, a user of the device is able easily to maintain the device in close proximity, to have the device readily available when needed.

While early-generation cellular communication systems, and devices operable therein, generally provided for voice communications and only limited data communication capabilities, successor generation systems, and devices operable therein, provide for increasingly data-intensive data services. Users of wireless devices increasingly use the wireless devices, not only for telephonic communication services, but also to perform the data communication services.

Message services, such as email and instant message services are amongst the data services that are available and utilized by users of the wireless devices. Such messages typically utilize alphanumeric textual data that is communicated between the wireless device and a communication endpoint. The use of alphanumeric, e.g., textual, messages permits the messages to be viewed at the convenience of a viewer, such as the user of the wireless device. Particularly when the communication service comprises an email communication service, a communicated message is reviewed by a recipient on an as-desired basis, that is, at the convenience of the recipient, such as the user of the device.

Recent years have witnessed the introduction and popular usage of wireless devices that include the capability to have such messages pushed to the wireless device to be available immediately for viewing and, if desired, formation of a response.

Significant attention has been directed towards user interfaces used in wireless, and other, devices that provide for data services. The user interface provides a mechanism by which a user receives information communicated to the device and also provides a mechanism for the formation of information that is communicated by the device. The user interface often times comprises a display screen and an input keyboard. In some implementations, the user interface is implemented as a touch-screen display in which inputs are generated by touching the display screen.

Often times also, when a message is received at the wireless device, an alert is generated to alert a user of the device of the delivery of the message. The user of the device, once alerted, is able immediately, if desired, to view the received message.

It is in light of this background that information related to user interfaces for wireless, or other electronic, devices that the significant improvements of the present disclosure have evolved.

DETAILED DESCRIPTION

Figure 1:
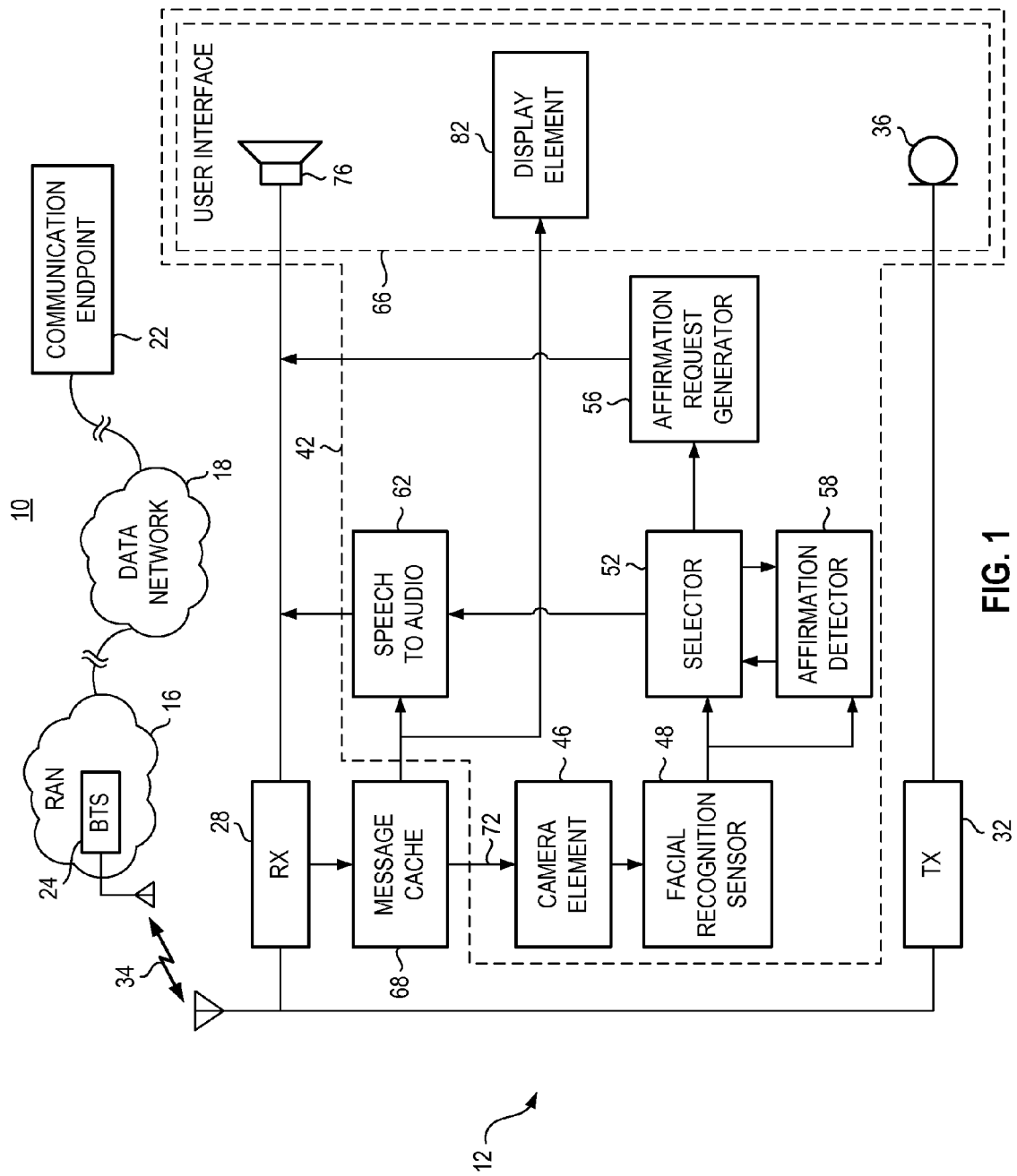
FIG. 1 illustrates a functional block diagram of a wireless device that includes an implementation of the present disclosure.

The present disclosure, accordingly, advantageously provides an apparatus, and an associated method, for delivering information to a wireless, or other electronic, device.

Through operation of an implementation of the present disclosure, a manner is provided by which to select delivery of the information based upon a facial recognition indication. The information is delivered in an aural manner responsive to a facial recognition indication of the user that indicates the information best to be delivered in aural, rather than textual, or other, form.

In one aspect of the present disclosure, facial recognition is used to select the manner of delivery that is most appropriate at the time of delivery. When information is received at the device, or as otherwise made available for delivery to the user of the device, a facial recognition indication of the user is obtained. And, based upon the indication, the selection of the delivery manner is made.

In another aspect of the present disclosure, an image detector, such as a camera lens assembly, is provided at a wireless, or other electronic, device. The camera lens assembly provides for recordation, or other viewing, of an image. A camera lens of the camera lens assembly is positionable to detect an image of the facial area of the user of the device.

In another aspect of the present disclosure, the facial image, once recorded or otherwise obtained, is analyzed. The analysis is carried out to detect a demeanor of the subject, i.e., the facial image of the user. The demeanor is ascertained by determining a facial configuration of portions of the facial image. And, by such determination, an indication of the demeanor of the subject is obtained.

In another aspect of the present disclosure, the facial recognition indication is obtained responsive to delivery at the wireless, or other electronic, device of a data message. Or, the facial recognition indication is obtained at selected intervals. The facial recognition indication is, obtained at a time proximate to delivery of the received information in human perceptible form to the user of the device. That is to say, the determination is made, based upon a facial image obtained in time proximity to the time at which the received information is to be delivered to the user of the device.

In another aspect of the present disclosure, the facial recognition indication is used to select in what manner to deliver the received information to the user of the device. The selection is made to deliver the information in a first manner if the facial recognition indicates the facial characteristics of the subject to be of first characteristics. And, the selection is made to deliver the information in a second manner if the facial recognition indication indicates the facial characteristic of the subject to be of second characteristics.

In another aspect of the present disclosure, the information is delivered in aural form if the facial recognition indication indicates the facial characteristic of the subject to be of the first characteristic. And, the selection is made to deliver the information in textual form if the facial recognition indication indicates the facial characteristic of the subject to be of the second characteristic.

In another aspect of the present disclosure, the selection is made to deliver the information in a first manner if the facial recognition indicates the subject to exhibit a selected facial characteristic, e.g., a serious demeanor. And, the selection is made to deliver the information in a second manner if the facial recognition indication indicates the subject not to exhibit the selected facial characteristic.

In another aspect of the present disclosure, a validation or affirmation of the selection is made. The affirmation or validation of the selection is made prior to delivering the information in the selected manner. The user of the device is provided with an indication of the selection. And, in response to being provided with the selection indication, the user is able to affirm or reject the selection. A sensor selects the affirmation or rejection made by the user.

In another aspect of the present disclosure, the affirmation detector detects a facial characteristic of the user by sensing a facial image of the user when the user affirms or rejects the selection. The facial recognition indication is formed through analysis of the sensed, facial image. The affirmation detector affirms or rejects the selection, as a result of the analysis of the facial characteristic of the subject, affirms, or rejects, the selection.

In another aspect of the present disclosure, the information is delivered in the selected manner. When the selected manner comprises aural delivery of the information, the received information is converted into aural form for delivery. The conversion is performed, for instance, by a text-to-audio transducer.

Thereby, information is delivered to the user of the device in a manner most-appropriate for the user based upon the facial characteristics of the user at a time proximate to the delivery of the information.

In these and other aspects, therefore, an apparatus, and an associated method, is provided for facilitating delivery of information at an electronic device. A delivery-type selector is configured to select in which of a first manner and a second manner to deliver the information. Selection is dependent upon a first facial recognition indication. An aural transducer is configured to transduce the information into aural form if the delivery-type selector selects the user delivery of the information in the first manner.

Referring first, therefore, to FIG. 1, a communication system, shown generally at 10 provides for communications with wireless devices, of which the wireless device 12 is representative. In the exemplary implementation, the communication system comprises a cellular communication system. And, the following description of exemplary operation shall be described with respect to the exemplary implementation. It should be understood, however, that in other implementations, the communication system is implemented in other manners. And, the teachings of the present disclosure are analogously applicable in such other types of communication systems, both wireless and wire line.

The communication system includes a network part, here including a radio access network (RAN) 16 and a data network 18, such as the internet. A communication endpoint 22 is placeable in communication connectivity with the data network.

Radio communications are made between radio transceiver circuitry, embodied at a base transceiver station (BTS) 24 of the radio access network and transceiver circuitry, represented by a receive (Rx) part 28 and a transmit (Tx) part 32 of the wireless device 12. Information, in the form of communication signals, is sent by way of radio channels, represented by the arrow 34, defined upon a radio air interface formed between the network and the wireless device.

In the exemplary implementation, the wireless device 12 is capable both of conventional, telephonic communication services and also to perform message communication services, such as e-mail messaging. For instance, an email message originated at the communication endpoint 22 is routable, by way of the data network 18, the radio access network 16, and radio channels 34 defined upon a radio air interface for delivery to the receive part 28 of the wireless device 12. Messages originated at the wireless device are analogously sent by the transmit part 32 by way of a reverse route for delivery to the communication endpoint 22. And, voice signals are transduced by the microphone 36 during telephonic operation of the device 10.

As mentioned previously, a message received at a wireless device is typically made available for viewing by a user of the wireless device. However, there are sometimes situations in which the user of the wireless device should not review the received message in visual form. The wireless device 12 includes an apparatus 42 of an implementation of the present disclosure that provides for an alternate manner by which to deliver the informational content of the received message to a user of the wireless device. The apparatus is functionally represented, implementable in any desired manner, including hardware elements, firmware elements, algorithm executable by processing circuitry, and combinations thereof. The apparatus 42 is here shown to include a camera element 46, a facial recognition sensor 48, a selector 52, an affirmation request generator 56, an affirmation detector 58, a speech-to-audio transducer 62, and a user interface 66.

In operation, when a message is delivered to the wireless device and detected by the receive part 28, the message is stored at a message cache 68. And, responsive to the message, an indication is provided, here represented by the arrow 72.

Responsive to the indication provided by way of the line 72, the camera element functions to sense or record an image. The camera element includes, for instance, a lens assembly, sensor element, and other circuitry need to sense or record an image. The image comprises a facial image of a subject, i.e., the facial image of a user of the wireless device or intended recipient of the received message or messages.

The sensed or recorded image, once obtained by the camera element 46, is analyzed by the facial recognition sensor 48. The sensor 48 operates to sense facial characteristics of the facial image of the subject sensed or analyzed by the camera element. The sensor operates to sense a selected characteristic of the subject. For example, the demeanor of the subject is sensed based upon the image obtained by the camera element. The determination is made, for instance, by analyzing a plurality of locations of the facial image. And, based upon the plurality of locations, the determination is made of the demeanor, or other selected characteristic, of the subject. If, for instance, the subject is operating a motor vehicle, the demeanor of the subject is likely to be serious. And, the subject would likely be distracted if required to read or otherwise view the received message. Conversely, if the determination is that the subject does not have a serious demeanor, then the subject is more likely to be readily available to read or otherwise view the received message in conventional manner. By causing selected characteristic to be the seriousness of the demeanor of the subject, an appropriate selection of the delivery manner is made to deliver the message to the motor-vehicle operator.

The selector 52 is provided with indications formed by the facial recognition sensor 48. And, the selector selects in what manner to deliver the received message to the user. If the subject is determined to exhibit the selected characteristic, the selector selects delivery of the receive message, i.e., information, in a first manner, here an aural form. And, if the determination is that the subject does not exhibit the selected characteristic, the selector selects delivery of the received information in a second manner, here a textual form.

In the exemplary implementation, responsive to initial selection of the delivery type, an affirmation from the user is obtained, particularly if the selection made by the selector is to deliver the information in aural form. To obtain the affirmation, the selector causes the affirmation request generator 56 to cause generation of an affirmation request, such as an audible sound generated by a speaker 76 of the user interface. The audible sound is at a level great enough to permit the user of the wireless device to detect the sound.

The user of the wireless device, in response, makes a facial contortion to affirm or to reject the selection made by the selector.

The camera element 46 senses the facial configuration of the user, and a facial recognition sensor operates to sense the facial configuration of the user responsive to the affirmation request. A determination is made as to whether the selection is affirmed or rejected. And, the affirmation detector 58 detects the determination. The detector detects whether the user has affirmed or rejected the selection. And, detection made by the detector is provided to the selector 52. The selector, based upon the selection and the affirmation of the selection causes the received message, stored at the message cache 68, to be converted into aural form by the speech to audio transducer 62 and then played out by the speaker 76 if the selection has been made and affirmed to deliver the information in aural form. If, conversely, selection is made to deliver the information in textual form, the information stored at the message cache 68 is provided to a display element 82 of the user interface and displayed in conventional manner.

Thereby, the manner by which the received message is delivered is dependent upon the facial recognition indication formed by the facial recognition sensor. If the sensed facial configuration is of a first configuration type, then selection is made to deliver the received message in a first manner, e.g., aurally. If conversely, the sense configuration is of second characteristics, the received message is caused to be delivered in another manner, e.g., textually. The selection is made without requiring specific user input. Rather, the camera element senses a facial indication, e.g., demeanor of the user, and selection is based upon the sensed facial configuration or indication. If, e.g., the sensed indication indicates the user to exhibit a serious demeanor, then selection is made to deliver the content of the received information in audio form. If, conversely, e.g., the user exhibits a less-serious demeanor, the message is delivered in visual form, necessitating viewing of the message displayed at a display element.

Figure 2:
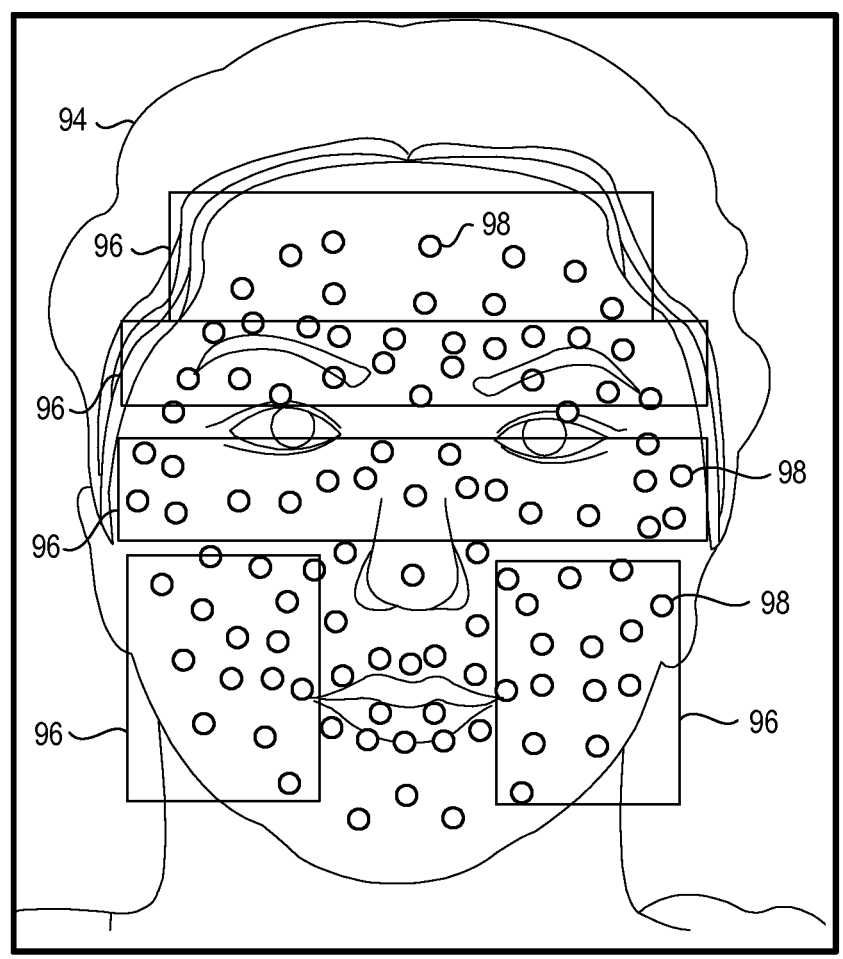
FIG. 2 illustrates an exemplary, sensed facial image from which a facial recognition indication is generated pursuant to exemplary operation of an implementation of the present disclosure.

FIG. 2 illustrates a representation 92 of an exemplary sensed image formed pursuant to operation of an implementation of the apparatus 42 shown in FIG. 1. The sensed image here comprises a portion of the body of a subject including portions of the face of the head 94 of the subject. The face of the subject is divided into multiple portions 96 and points of interest 98 in different ones of the portions 96. The points of interest are analyzed to obtain the facial recognition indication that indicates the characteristic of the subject, such as the demeanor of the subject.

Figure 3:
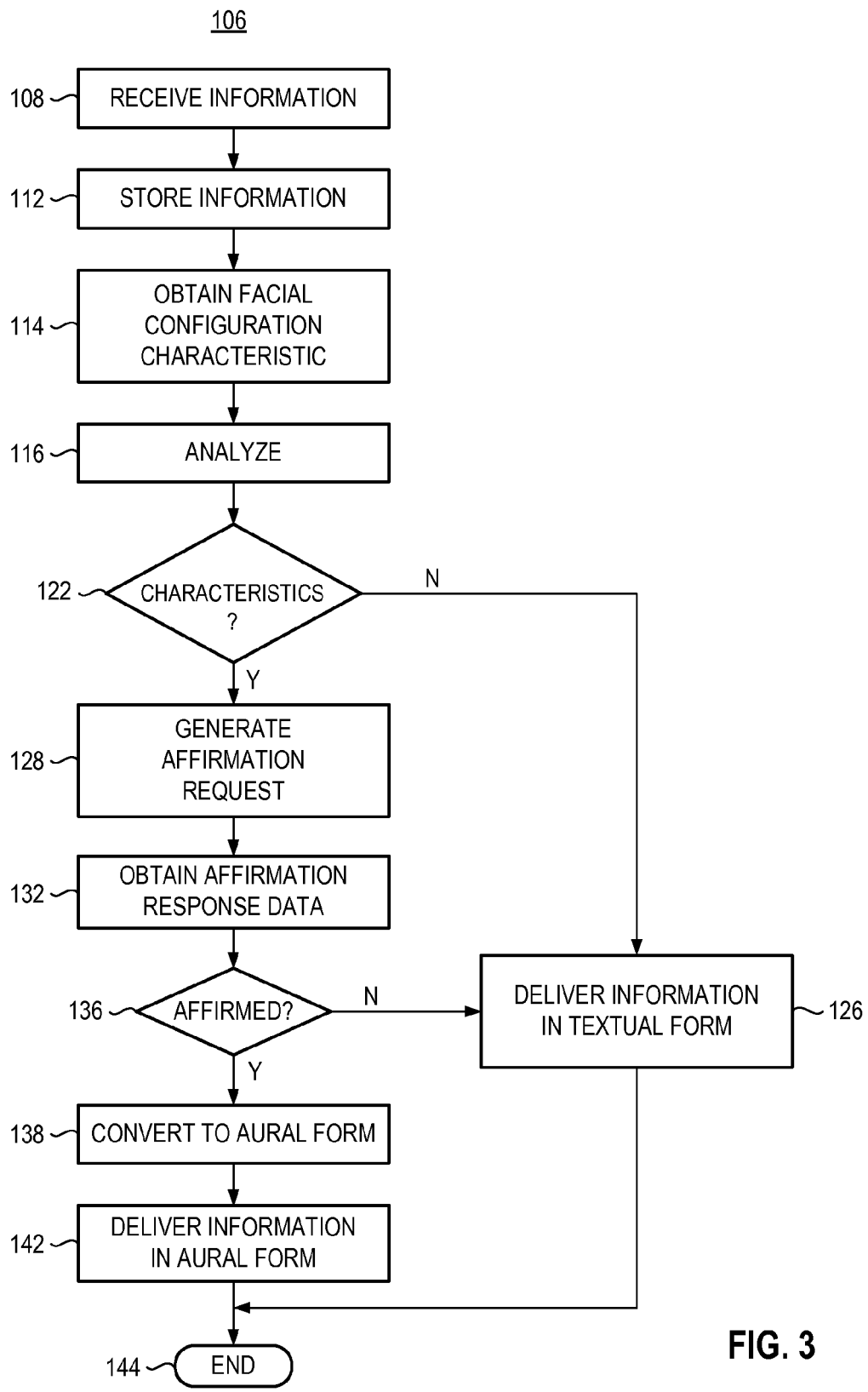
FIG. 3 illustrates a message sequence diagram representative of exemplary operation of an implementation of the present disclosure.

FIG. 3 illustrates a process diagram 106 representative of the process of operation of an implementation of the present disclosure. The process provides for delivery of received information at a wireless, or other electronic, device. The delivery of the informational content of the message to a user is made in the manner determined to be most appropriate based upon quantitatively-obtained characteristics of a facial characteristic of a user of the device.

First, and as indicated by the block 108, information, such as an email message, is received and detected at the device. Then, and as indicated by the block 112, the received and detected information is stored. Then, and as indicated by the block 114, a facial configuration characteristic is obtained. The facial configuration characteristic is obtained by positioning a camera element to sense the facial portion of a subject, the user of the device.

Once the facial configuration characteristics have been obtained, the characteristics are analyzed, indicated by the block 116. Then, and as indicated by the decision block 122, a determination is made as to whether the facial configuration of the subject exhibits a selected characteristic. If not, the no branch is taken to the block 126, and the received information is displayed at a display element, i.e., displayed in textual form or viewing by a user.

If, conversely, a determination is made at the decision block 122 that the subject exhibits the selected characteristic, the yes branch is taken, and an affirmation request is generated, indicated by the block 128. And, as indicated by the block 132, a facial configuration characteristic of the subject, subsequent to generation of the affirmation request, is obtained.

Then, and as indicated by the decision block 136, a determination is made as to whether the subject has affirmed selection to deliver the received information in aural form. If not, the no branch is taken to the block 126. Otherwise the yes branch is taken to the block 138, and the received information is converted into aural form. Then, as indicated by the block 142, the information is played-out in audio form. After delivery of the information at the block 126 or 142, paths are taken to the end block 144, and the process ends.

Figure 4:
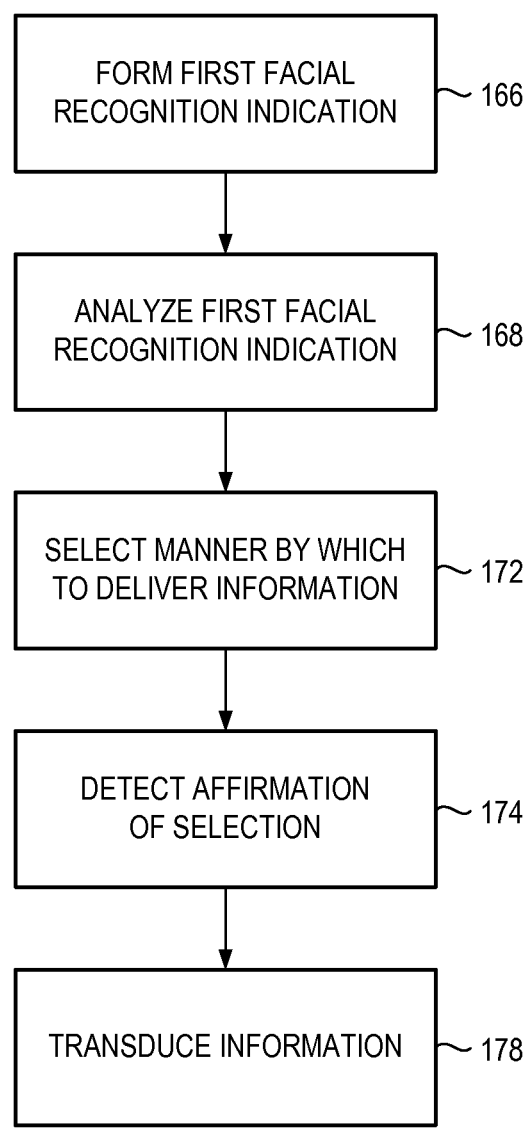
FIG. 4 illustrates a method flow diagram representative of a method of operation of an implementation of the present disclosure.

FIG. 4 illustrates a method flow diagram 162 representative of a method of operation of an implementation of the present disclosure. The method facilitates delivery of information at a wireless device. First, and as indicated by the block 166, a first facial recognition indication is formed. Then, and as indicated by the block 168, the first facial recognition indication is analyzed. And, as indicated by the block 172, a selection is made of in which of a first manner and a second manner to deliver the information. The selection is dependent upon the first facial recognition indication. Then, and as indicated by the block 174, affirmation of the selection is detected. And, as indicated by the block 178, the information is transduced into selected form if selection has been made, and affirmed, that the information is to be delivered in the selected form.

Thereby, a manner is provided by which to deliver information in a manner that is most appropriate based upon a facial characteristic of the recipient. Thus, when a message is received at a wireless device or other communication device such as communication device 10 in FIG. 1, based on a determination of the facial characteristics of a user of the device, alerts and notices of the message are managed in a manner that is appropriate to the facial characteristics, which for instance, when the user is operating a motor vehicle, will provide less distraction to the user from operating the motorized vehicle.

Presently preferred implementations of the disclosure and many of its improvements and advantages have been described with a degree of particularity. The description is of preferred examples of implementing the disclosure, and the description of examples is not necessarily intended to limit the scope of the disclosure. The scope of the disclosure is defined by the following claims.

What is claimed is:

1. An apparatus for facilitating delivery of information at an electronic device, the apparatus comprising:
    a delivery-type selector configured to select in which of a first manner and a second manner to deliver the information, selection dependent upon a detected facial demeanor characteristic; and
    a transducer configured to transduce the information into form for delivery in the first manner if the delivery-type selector selects the user delivery of the information in the first manner.

2. The apparatus of claim 1 wherein the first manner comprises an aural delivery manner and the second manner comprises a visual delivery manner and wherein the delivery-type selector is configured to select in which of the aural delivery manner and the visual delivery manner to deliver the information.

3. The apparatus of claim 1 further comprising a facial recognition sensor configured to detect the facial demeanor characteristic responsive to which the delivery-type selector is configured to make selection of in which of the first and second manners, respectively, to deliver the information.

4. The apparatus of claim 3 wherein the facial recognition sensor comprises a user-directable, wireless-device-positioned camera element configured to sense a camera image.

5. The apparatus of claim 4, wherein the facial recognition sensor is further configured to analyze the facial demeanor characteristic when the camera image sensed by the user-directable, wireless-device-positioned camera element senses a facial image.

6. The apparatus of claim 5 wherein the facial demeanor characteristic analyzed by the facial recognition sensor comprises a serious demeanor.

7. The apparatus of claim 1 wherein the information comprises textual information, wherein the first manner comprises an aural delivery manner and the second manner comprises a visual delivery manner and wherein the delivery-type selector is configured to select in which of the aural delivery manner and the visual delivery manner to deliver the textual information dependent upon the detected facial demeanor characteristic.

8. The apparatus of claim 1 wherein the transducer comprises a text-to-voice transducer.

9. The apparatus of claim 1 further comprising a confirmation detector configured to detect affirmation of selection by the delivery-type selector to deliver the information in the first manner.

10. The apparatus of claim 9 wherein the confirmation detector comprises a facial recognition sensor configured to detect the affirmation of the selection by the delivery-type selector.

11. The apparatus of claim 10 further comprising an indicator configured to generate an indication of the selection made by the delivery-type selector and wherein the confirmation detector is configured to make selection subsequent to generation by the indicator of the indication.

12. A method for facilitating delivery of information at an electronic device, the method comprising:
    selecting in which of a first manner and a second manner to deliver the information, selection dependent upon a detected facial demeanor characteristic; and
    transducing the information into form for delivery in the first manner if selection during the selecting comprises selection of delivery of the information in the first manner.

13. The method of claim 12 wherein the first manner comprises an aural delivery manner and the second manner comprises a visual delivery manner, and wherein the selecting comprises selecting in which of the aural delivery manner and the visual delivery manner to deliver the information.

14. The method of claim 12 wherein the first manner comprises an aural delivery manner and the second manner comprises a non-aural delivery manner and wherein the selecting comprises selecting in which of the aural delivery manner and the non-aural delivery manner to deliver textual information dependent upon the detected facial demeanor characteristic.

15. The method of claim 12 further comprising detecting the facial demeanor characteristic.

16. The method of claim 12 further comprising analyzing the detected facial demeanor characteristic and wherein the selecting is responsive to analysis during the analyzing.

17. The method of claim 12 further comprising detecting affirmation of selection made during the selecting.

18. The method of claim 17 wherein the detecting affirmation comprises forming a second facial recognition indication.

19. A method for delivering information, received at a wireless device, in human perceptible form, the method comprising:
    deciding whether to deliver the information in aural form based upon a facial demeanor characteristic; and
    delivering the information in aural form if the facial demeanor characteristic is indicative that the information would be better received in aural form.

* * * * *